United States Patent Office 3,631,211
Patented Dec. 28, 1971

3,631,211
PREPARATION OF GEM-DIARYLALKANES
Louis Schmerling, Riverside, Ill., assignor to Universal Oil Products Company, Des Plaines, Ill.
No Drawing. Filed Apr. 20, 1970, Ser. No. 30,354
Int. Cl. C07c 15/12
U.S. Cl. 260—668 C    11 Claims

ABSTRACT OF THE DISCLOSURE

Gem-diarylalkanes are prepared by reacting an arylalkane with an alkyl-free aromatic hydrocarbon in the presence of a catalyst comprising a Friedel-Crafts metal halide and a higher valence halide of a metal which possesses at least two valences.

This invention relates to a method for the preparation of gem-diarylalkanes. More particularly, the invention is concerned with a process for preparing gem-diarylalkanes utilizing a catalyst which consists of a mixture of two separate metal halides.

The products which are obtained by utilizing the process of the present invention will comprise paraffins which contain two aryl substitutents on a single carbon atom. For example, unsymmetrical diphenylethane or 1,1-diphenylethane will find a use in the chemical industry as a solvent for nitrocellulose and, in addition, may also be used as an intermediate in organic syntheses. Another compound which may be prepared according to the process of this invention comprises diphenylmethane which also may be used as an intermediate in organic syntheses, in dyes and in perfumery.

It is, therefore, an object of this invention to provide a process for preparing paraffinic hydrocarbons which contain two aryl substituents on a single carbon atom.

A further object of this invention is to provide a process for preparing gem-diarylalkanes utilizing certain catalytic compositions of matter which comprise a mixture of two metal halides.

In one aspect an embodiment of this invention is found in a process for the preparation of a gem-diarylalkane which comprises reacting an arylalkane with benzene in the presence of a catalyst consisting of a Friedel-Crafts metal halide and a higher valence halide of a metal which possesses at least two valences at reaction conditions, and recovering the resultant gem-diarylalkane.

A specific embodiment of this invention resides in a process for the preparation of a gem-diarylalkane which comprises reacting ethylbenzene and benzene in the presence of a catalyst consisting of an aluminum chloride-cupric chloride mixture at a temperature in the range of from about ambient to about 100° C. and a pressure in the range of from about atmospheric to about 100 atmospheres, and recovering the resultant 1,1-diphenylethane.

Other objects and embodiments will be found in the following further detailed description of the present invention.

As hereinbefore set forth the present invention is concerned with a process for the preparation of gem-diarylalkanes in which an arylalkane is reacted with an alkyl-free aromatic hydrocarbon such as benzene or naphthalene, in the presence of certain catalytic compositions of matter of the type hereinafter set forth in greater detail. The arylalkanes which may be reacted with an aromatic hydrocarbon such as benzene include mono- and polyalkylbenzenes, mono- and polyalkylnaphthalenes as well as alkylated fused ring compounds. For purposes of this invention the term "arylalkane" as used in the present specification and appended claims will include straight or branched chain alkyl-substituted aromatic compounds, cycloalkyl-substituted aromatic compounds and fused ring aromatic compounds, the only criterion being that at least one alkyl group of the arylalkane must have at least one hydrogen atom attached to the α-carbon atom of the side chain group. Thus, it is possible to utilize primary and secondary alkyl groups as well as cycloalkyl and fused ring groups while it is not contemplated that tertiary alkyl groups will constitute an operable specie. Some specific examples of these arylalkanes which may be used as one of the starting materials for the process of this invention will include toluene, ethylbenzene, n-propylbenzene, isopropylbenzene (cumene), n-butylbenzene, sec-butylbenzene, n-amylbenzene, sec-amylbenzene as well as normal and secondary alkyl substituents up to about 20 carbon atoms in length, these compounds including the straight and branched chain hexyl-, heptyl-, octyl-, nonyl-, decyl-, undecyl-, dodecyl-, tridecyl-, tetradecyl-, pentadecyl-, hexadecyl-, heptadecyl-, octadecyl-, nonadecyl-, and eicosylbenzenes; cycloalkyl-substituted benzenes such as cyclopentylbenzene, cyclohexylbenzene, etc.; fused ring compounds such as indan, 1,2,3,4-tetrahydronaphthalene, etc.; o-xylene, m-xylene, p-xylene, m-ethyltoluene, o-ethyltoluene, p-ethyltoluene, m-propyltoluene, o-propyltoluene, p-propyltoluene, m-isopropyltoluene, o-isopropyltoluene, p-isopropyltoluene, etc., methylnaphthalene, ethylnaphthalene, n-propylnaphthalene, isopropylnaphthalene, n-butylnaphthalene, sec-butylnaphthalene, cyclopentylnaphthalane, cyclohexylnaphthalene, etc. It is to be understood that the forementioned arylalkanes are only representative of the class of compounds which may be used, and that the present invention is not necessarily limited thereto.

The catalytic composition of matter which is utilized to effect the process of this invention will comprise a mixture of a Friedel-Crafts metal halide and a higher valence halide of a metal which possesses at least two valences and, in addition, has the further criteria of being a weak or totally inactive Friedel-Crafts catalyst when used by itself. Examples of active Friedel-Crafts metal halides which will constitute one part of the catalytic composition of matter will include aluminum chloride, zinc chloride, zirconium chloride, ferric chloride, boron trifluoride, etc., the preferred metal halides comprising aluminum chloride and zinc chloride. The preferred higher valence halide of a metal which possesses at least two valences is cupric chloride although other inactive metal halide compounds which possess two valences may also be used. Suitable other metals which form at least two metal halides differing in valence include mercury, tin, cobalt, molybdenum, manganese, titanium and chromium. The various bromides and chlorides of the above metals including mercuric chloride, mercuric bromide, cupric bromide, stannic chloride, stannic bromide, cobaltic chloride, cobaltic bromide, molybdenum trichloride, molybdenum tetrachloride, molybdenum pentabromide, manganese trichloride, manganese tribromide, titanium tetrachloride, titanium tetrabromide, chromic chloride, chromic bromide, etc are thus utilizable within the scope of this invention. The two components of the catalyst are present in such an amount so that there may be a catalytic amount of the active Friedel-Crafts metal halide and a stoichiometric amount of the higher valence halide of the metal which possesses at least two valences.

The reaction conditions at which the process of this invention is effected will include temperatures in a range of from ambient (about 24° C.) up to about 250° C. and a pressure in the range of from atmospheric up to about 100 atmospheres or more. The pressure is usually such that a portion of the reactants is in the liquid phase. In the preferred embodiment of the invention the reaction is effected in the presence of an added amount of hydrogen chloride and air whereby the cupric chloride, after being reduced to cuprous chloride is regenerated for further use in situ.

The process of this invention may be effected in any suitable manner and may comprise either a batch or continuous type operation. For example, when a batch type operation is used and the reaction is to be effected utilizing a particularly active Friedel-Crafts metal halide as one portion of the catalytic composition of matter, aluminum chloride being a specific example, said reaction may be effected by utilizing a reaction apparatus such as a flask, placing the arylalkane and the benzene therein and adding the mixed catalyst in incremental portions during a predetermined time period to a stirred mixture of the reactants. In addition, hydrogen chloride may also be present and air circulated thereto whereby the reduced cupric chloride is regenerated. After a predetermined residence time which may range up to about 10 hours in duration, the product is hydrolyzed by the addition of ice water filtered to separate the solid catalyst and thereafter the aqueous layer is separated from the organic layer. The layers are then treated by conventional means of extraction with an organic solvent such as ether or benzene and the desired gem-diarylalkane is recovered, suitably by distillation. It is also contemplated that the reaction may be effected in a batch type operation utilizing elevated temperatures and pressures. When such a process is used the arylalkane and the benzene are placed in a reaction apparatus such as a rotating autoclave along with the catalyst composite of the type hereinbefore set forth in greater detail and hydrogen chloride. The autoclave is sealed and brought to the desired operating pressure by introducing an inert gas such as nitrogen, an oxygen-containing gas as air or a mixture thereof into the autoclave. Following this the autoclave is heated to the desired operating temperature and maintained thereat for a predetermined period of time. At the end of which heating is discontinued, the autoclave is allowed to return to room temperature and the excess pressure is discharged. The reaction mixture is recovered, separated from the catalyst and subjected to conventional means of separation, purification and recovery whereby the desired gem-diarylalkane is isolated from unreacted starting materials and/or undesired side reactions which may have occurred.

It is also contemplated within the scope of this invention that the reaction for the preparation of a gem-diarylalkane may be effected in a continuous way. One such method of effecting this type of operation is to continuously charge the starting materials comprising the arylalkane and the benzene (and, if desired, air with or without hydrogen chloride) to a reaction vessel which is maintained at the desired operating conditions of temperature and pressure and which contains the catalyst composite. The arylalkane and the benzene may be charged to the reaction vessel through separate lines or, if so desired, they may be admixed prior to entry into said reactor and charged thereto in a single stream. After completion of the desired residence time has elapsed, the reactor effluent is continuously withdrawn and the desired gem-diarylalkane is separated from any unreacted starting materials and/or side products, the gem-diarylalkane being sent to storage while the unreacted starting materials are recycled to form a portion of the feed stock. Due to the physical nature of the catalyst composite, it is possible to effect a continuous manner of operation by utilizing a fixed bed method whereby the catalyst is disposed as a fixed bed in the reactor and the reactants are passed therethrough in either an upward or downward flow; by utilizing a moving bed type of operation in which the catalyst bed and the reactants pass through the reactor either concurrently or countercurrently to each other, or a slurry type operation in which the catalyst is carried into the reactor as a slurry in one or both of the starting materials.

Examples of gem-diarylalkanes which may be prepared according to the process of this invention will include diphenylmethane, 1,1 - diphenylethane, 1,1 - diphenylpropane, 2,2 - diphenylpropane, 1,1 - diphenylbutane, 2,2-diphenylbutane, 1,1-diphenylpentane, 2,2-diphenylpentane, 3,3-diphenylpentane, 1- and 2-benzylnaphthalene, 1- and 2-(2-methylbenzyl)naphthalene, etc. It is to be understood that the aforementioned gem-diarylalkanes are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 32 g. (0.41 mole) of benzene and 21 g. 0.2 mole of ethylbenzene were placed in an Erlenmeyer flask provided with magnetic stirring means. A catalyst was then prepared by admixing equimolar amounts of anhydrous cupric chloride and aluminum chloride. Following this 20 g. of this catalyst composite was added to the stirred mixture of the benzene and ethylbenzene at ambient temperature, the temperature of the reaction rising from 23° to 38° C. during a period of 2 minutes with a concurrent evolution of hydrogen chloride. During the following 15 minutes the temperature slowly fell to 28° C. Following this a second portion of the catalyst in an amount of 18 g. was added to the solution, the temperature again rising to 33° C. during a 2 minute period. The mixture was continuously stirred for an additional period of 0.5 hour during which time the temperature fell to 27° C. At the end of this time a third portion of catalyst in an amount of 12 g. was added to the solution, the temperature again rising to 29° C. during a 3 minute period. The solution was stirred for a period of 2 hours during which time the temperature again fell to 27° C. At the end of this time period the product was hydrolyzed with ice water, filtered to separate the cuprous chloride, and the aromatic product in the filtrate was separated from the aqueous layer by extraction with ether. Analysis of the ether solution indicated the formation of 1,1-diphenylethane in a 44% yield based on the cupric chloride.

EXAMPLE II

In this example 1.2 moles of benzene and 0.3 mole of ethylbenzene were placed in the glass liner of a rotating autoclave along with a catalyst comprising a mixture of zinc chloride and cupric chloride, the components being present in a 4:1 molar ratio of cupric chloride to zinc chloride. The autoclave was sealed and nitrogen pressed in until an initial pressure of 30 atmospheres was reached. The autoclave was then heated to a temperature of 200° C. and maintained thereat for a period of 4 hours, the maximum pressure at this operating temperature being 70 atmospheres. At the end of the 4 hour period, heating was discontinued and, after the autoclave had returned to room temperature, the final pressure reached 30 atmospheres. The excess pressure was discharged, the autoclave was opened and the reaction mixture was recovered. After treatment of the mixture in a manner similar to that set forth in Example I above, it was determined that a 4 mole percent yield of 1,1-diphenylethane based on the cupric chloride was obtained.

EXAMPLE III

To illustrate the advantage of using hydrogen chloride and an oxygen-containing gas, another experiment was performed in which 1.2 moles of benzene and 0.3 mole of ethylbenzene were placed in an autoclave along with 0.5 mole of a zinc chloride-cupric chloride mixture in which the cupric chloride was present in a 4:1 molar ratio over the zinc chloride. In addition, 0.3 mole of anhydrous hydrogen chloride and 15 atmospheres each of air and nitrogen were introduced into the sealed autoclave. The autoclave was heated to a temperature of 200° C. and maintained thereat for a period of 4 hours during which time the maximum pressure reached 48 atmospheres. At the end of the 4 hour residence time, heating was discontinued and, when the autoclave had reached room temperature, the final pressure had dropped to 30 atmospheres. The excess pressure was discharged, the autoclave was opened and the reaction mixture treated in a manner similar to that set forth in Example I above. There was recovered 22 mole percent of 1,1-diphenylethane based upon the copper chloride.

EXAMPLE IV

Another example was run in which the amount of cupric chloride in the mixture with zinc chloride was decreased. In this example 1.2 mole of benzene and 0.3 mole of ethylbenzene were placed in the glass liner of a rotating autoclave along with 0.15 mole of a cupric chloride-zinc chloride mixture, said cupric chloride being present in a 0.5:1 mole ratio to the zinc chloride. The autoclave was sealed and 0.3 mole of anhydrous hydrogen chloride gas was pressed in. Following this the autoclave was pressured to 30 atmospheres by the introduction of 15 atmospheres of air and 15 atmospheres of nitrogen. The autoclave was heated to a temperature of 200° C. and maintained thereat for a period of 4 hours during which time the maximum pressure reached 52 atmospheres. At the end of this time heating was discontinued, the autoclave was allowed to return to room temperature and the excess pressure of 28 atmospheres was discharged. After recovery and treatment of the reaction mixture in a manner similar to that set forth in Example I above, there was isolated 66 mole percent of 1,1-diphenylethane based on the cupric chloride, thus illustrating the more efficient utilization of the cupric chloride.

The above experiments condensing benzene and ethylbenzene were repeated utilizing catalytic compositions of matter comprising mercuric chloride-zinc chloride and a titanium tetrachloride-zinc chloride mixtures in a 4:1 mole ratio under identical conditions. The experiments resulted in the formation of 1,1-diphenylethane.

To illustrate the necessity for the presence of cupric chloride and zinc chloride, another experiment was performed utilizing identical conditions as set forth in the above paragraph with the exception being that the catalyst comprised 0.4 mole of cupric chloride, no zinc chloride being present in the reaction mixture. Analysis of the reaction product disclosed unidentified products amounting to about 6 weight percent of the reaction mixture, with no 1,1-diphenylethane being identified.

EXAMPLE V

A mixture of 0.12 moles of benzene and 0.3 mole of n-propylbenzene is placed in the glass liner of a rotating autoclave along with a catalyst comprising a cupric chloride-aluminum chloride mixture in which the cupric chloride is present in a 0.5:1 mole ratio to the aluminum chloride. The autoclave is sealed and 0.3 mole of anhydrous chloride is charged thereto. Following this the autoclave is charged to a pressure of 30 atmospheres by the introduction of 30 atmospheres of air. Thereafter the autoclave is heated to a temperature of 40° C. and maintained thereat for a period of 4 hours. At the end of this time heating is discontinued and, after the autoclave has returned to room temperature, the excess pressure is vented. The autoclave is opened and the reaction product is treated in a manner similar to that set forth in Example I, the desired product comprising 1,1-diphenylpropane being recovered therefrom.

EXAMPLE VI

To an Erlenmeyer flask is charged a mixture of 1.2 moles of benzene and 0.3 mole of cumene (isopropylbenzene). The mixture is stirred by means of a magnetic stirrer while 20 g. of a cupric chloride-aluminum chloride mixture is added thereto in three incremental portions at intervals of 0.5 hour. At the end of an additional 2 hours of stirring time the product is hydrolyzed by the addition of ice water, filtered to separate the catalyst and the organic product in the filtrate is separated from the aqueous layer by extraction with ether. The desired product comprising 2,2-diphenylpropane is then recovered from the ether extract by fractional distillation.

EXAMPLE VII

A mixture of 1.2 moles of benzene and 0.5 mole of toluene is placed in the glass liner of a rotating autoclave along with 0.15 mole of a catalytic composition of matter comprising a cupric chloride-zinc chloride mixture in which the cupric chloride is present in a 0.5:1 mole ratio to the zinc chloride. The autolave is sealed and, after 0.3 mole of anhydrous chloride is added, the autoclave is pressured to 30 atmospheres by the introduction of 15 atmospheres of air and 15 atmospheres of nitrogen. The autoclave is heated to the temperature of 200° C. and maintained thereat for a period of 4 hours. At the end of which time heating is discontinued and the autoclave allowed to return to room temperature. The excess pressure is vented, the autoclave is opened and the reaction mixture is recovered. After treatment in a manner similar to that set forth in the above examples, the desired product comprising diphenylmethane is recovered.

EXAMPLE VIII

In this example a mixture of 1.2 mole of benzene and 0.5 mole of indan is treated in the presence of a catalytic composition of matter comprising an aluminum chloride-cupric chloride mixture in a manner similar to that set forth in Example I above. Analysis of the ether solution of the product will disclose the presence of 1-phenylindan.

EXAMPLE IX

A mixture of 1.0 mole of toluene and 2.5 moles of naphthalene is heated in an autoclave at 200° C. with 20 g. of zinc chloride and 70 g. of cupric chloride under 30 atmospheres of air. The recovered product is worked up in the usual manner, and a mixture of 1- and 2-benzylnaphthalene is recovered.

I claim as my invention:

1. A process for the preparation of a gem-diarylalkane which comprises reacting an arylalkane with an alkyl-free aromatic hydrocarbon in the presence of a catalyst consisting of a Friedel-Crafts metal halide and a higher valence halide of a metal which possesses at least two valences at reaction conditions, and recovering the resultant gem-diarylalkane.

2. The process as set forth in claim 1 in which at least one alkyl group of said arylalkane possesses at least one hydrogen atom attached to an α-carbon atom.

3. The process as set forth in claim 1 in which said alkyl-free aromatic hydrocarbon is benzene or naphthalene.

4. The process as set forth in claim 1 in which said reaction conditions include a temperature in the range of from about ambient to about 250° C. and a pressure in the range of from about atmospheric to about 100 atmospheres.

5. The process as set forth in claim 1 in which said catalyst comprises an aluminum chloride-cupric chloride mixture.

6. The process as set forth in claim 1 in which said catalyst comprises a zinc chloride-cupric chloride mixture.

7. The process as set forth in claim 1 in which said arylalkane is ethylbenzene, said alkyl-free aromatic hydrocarbon is benzene, and said gem-diarylalkane is 1,1-diphenylethane.

8. The process as set forth in claim 1 in which said arylalkane is n-propylbenzene, said alkyl-free aromatic hydrocarbon is benzene, and said gem-diarylalkane is 1,1-diphenylpropane.

9. The process as set forth in claim 1 in which said arylalkane is cumene, said alkyl-free aromatic hydrocarbon is benzene, and said gem-diarylalkane is 2,2-diphenylpropane.

10. The process as set forth in claim 1 in which said arylalkane is toluene, said alkyl-free aromatic hydrocarbon is naphthalene, and said gem-diarylalkane is a benzylnaphthalene.

11. The process as set forth in claim 1 in which said arylalkane is indan, and said gem-diarylalkane is 1-phenylindan.

References Cited

UNITED STATES PATENTS

| | | | |
|---|---|---|---|
| 3,109,868 | 11/1963 | Fields et al. | 260—668 C |
| 3,428,700 | 2/1969 | Cyba | 260—668 C |

FOREIGN PATENTS

| | | | |
|---|---|---|---|
| 540,384 | 4/1957 | Canada | 260—668 C |

CURTIS R. DAVIS, Primary Examiner